United States Patent
Lin et al.

(10) Patent No.: US 11,566,954 B2
(45) Date of Patent: Jan. 31, 2023

(54) FORCE MEASUREMENT DEVICE FOR MEASURING LOW-FREQUENCY FORCE AND HIGH-FREQUENCY FORCE

(71) Applicant: INDUSTRIAL TECHNOLOGY RESEARCH INSTITUTE, Hsinchu (TW)

(72) Inventors: Chih-Che Lin, Tainan (TW); Chih-Yuan Chen, Tainan (TW); Chung-Yuan Su, Tainan (TW); Chao-Ta Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 163 days.

(21) Appl. No.: 16/899,475

(22) Filed: Jun. 11, 2020

(65) Prior Publication Data
US 2021/0199518 A1    Jul. 1, 2021

(30) Foreign Application Priority Data
Dec. 26, 2019   (TW) .................................. 108147875

(51) Int. Cl.
*G01L 1/18*     (2006.01)
*G01L 1/16*     (2006.01)

(52) U.S. Cl.
CPC ............... *G01L 1/183* (2013.01); *G01L 1/16* (2013.01)

(58) Field of Classification Search
CPC ....... G01L 1/183; G01L 1/16; G01C 19/5712; G06F 3/016
(Continued)

(56) References Cited

U.S. PATENT DOCUMENTS 3,561,263 A    2/1971   Ward et al.
4,175,428 A   11/1979   Eilersen
(Continued)

FOREIGN PATENT DOCUMENTS

CN    102840935 A    12/2012
CN    103921174 A     7/2014
(Continued)

OTHER PUBLICATIONS

TW Notice of Allowance in Application No. 108147875 dated Nov. 6, 2020.
(Continued)

*Primary Examiner* — Octavia Davis Hollington
(74) *Attorney, Agent, or Firm* — Maschoff Brennan

(57) ABSTRACT

The disclosure relates to a force measurement device including central portion, fixing portion, first and second sensing portions, and first and second electromechanical elements. The first sensing portion has first natural frequency. The first sensing portion is connected to the central portion. The second sensing portion has a second natural frequency. The second sensing portion is connected to the first sensing portion and the fixing portion. The first electromechanical element is disposed on the first sensing portion to measure a first vibration amplitude. The second electromechanical element is disposed on the second sensing portion to measure a second vibration amplitude. When the central portion is subjected to a first force, the first vibration amplitude is larger than the second vibration amplitude. When the central portion is subjected to a second force, the first vibration amplitude is smaller than the second vibration amplitude.

24 Claims, 8 Drawing Sheets

(58) Field of Classification Search
USPC .................................................. 73/862.625
See application file for complete search history.

(56) References Cited

U.S. PATENT DOCUMENTS

| | | | |
|---|---|---|---|
| 4,802,371 | A | 2/1989 | Calderara et al. |
| 5,325,701 | A | 7/1994 | Zilliacus |
| 5,402,684 | A | 4/1995 | Engeler et al. |
| 5,821,432 | A | 10/1998 | Sidler et al. |
| 7,536,924 | B2 | 5/2009 | Schmitz et al. |
| 8,272,267 | B2* | 9/2012 | Tamura ............ G01C 19/5712 73/504.12 |
| 8,726,740 | B1 | 5/2014 | Mekid |
| 2005/0066742 | A1 | 1/2005 | Kim |
| 2006/0032306 | A1 | 2/2006 | Robert |
| 2007/0277609 | A1 | 12/2007 | Schmitz et al. |
| 2012/0325019 | A1 | 12/2012 | Shau et al. |
| 2017/0156002 | A1 | 6/2017 | Han et al. |
| 2017/0276559 | A1 | 9/2017 | Castano Cano et al. |
| 2017/0285332 | A1 | 10/2017 | Merli et al. |
| 2018/0031601 | A1 | 2/2018 | Anac et al. |
| 2019/0331543 | A1 | 10/2019 | Cavalloni et al. |
| 2020/0200629 | A1* | 6/2020 | Lin ........................ G01L 5/162 |

FOREIGN PATENT DOCUMENTS

| | | |
|---|---|---|
| CN | 104139322 A | 11/2014 |
| CN | 205861251 U | 1/2017 |
| CN | 110036268 A | 7/2017 |
| CN | 107314849 A | 11/2017 |
| EP | 0270693 B1 | 7/1991 |
| EP | 0594534 A1 | 4/1994 |
| JP | H01135445 A | 5/1989 |
| JP | 07190784 * | 7/1995 |
| JP | 2000061781 A | 2/2000 |
| JP | 2002233992 A | 8/2002 |
| TW | 459993 U | 10/2001 |
| TW | 201712307 A | 4/2017 |
| WO | 02077593 A1 | 10/2002 |
| WO | 2006/039448 A2 | 4/2006 |
| WO | 2012155282 A2 | 11/2012 |
| WO | 2014/093727 A1 | 6/2014 |

OTHER PUBLICATIONS

Yaldiz et al. "Design, development and testing of a four-component milling dynamometer for the measurement of cutting force and torque" Mechanical Systems and Signal Processing (Apr. 21, 2007) 1499-1511.

Kang et al. "Development and evaluation of tool dynamometer for measuring high frequency cutting forces in micro milling" International Journal of Precision Engineering and Manufacturing vol. 11, No. 6, pp. 817-821; Dec. 4, 2010.

Totis et al. "Development of an innovative plate dynamometer for advanced milling and drilling applications" Measurement 49 (Mar. 2014) 164-181.

CN Office Action in Application No. 202010137980.5 dated Dec. 16, 2021.

Xu, Zhijun "Design Research Physics Experiment" Sep. 30, 2012.

* cited by examiner

FORCE MEASUREMENT DEVICE FOR MEASURING LOW-FREQUENCY FORCE AND HIGH-FREQUENCY FORCE

CROSS-REFERENCE TO RELATED APPLICATIONS

This non-provisional application claims priority under 35 U.S.C. § 119(a) on Patent Application No(s). 108147875 filed in Taiwan (ROC) on Dec. 26, 2019, the entire contents of which are hereby incorporated by reference.

TECHNICAL FIELD

The disclosure relates to a force measurement device for simultaneously measuring low-frequency force and high-frequency force.

BACKGROUND

A workpiece is generally subjected to variable forces of different frequencies during the machining process, such as a feeding force with low frequency and a cutting force with high frequency. The feeding force is the force that forces the cutting tool to move inwards from the surface of the workpiece and is usually a low-frequency force. And the cutting force is the force that the cutting tool is removing small chips of material from the workpiece and is usually a high-frequency force.

During the machining process, the actual condition of the workpiece sometimes is not as expected. Therefore, it is required to timely monitor the feeding force and cutting force to obtain key information on the variations of the feeding and cutting force, and the information is needed for the basis of later compensation control and condition analysis or diagnosis.

SUMMARY

One embodiment of the disclosure provides a force measurement device including a central portion, at least one fixing portion, at least one first sensing portion, a second sensing portion, at least one first electromechanical element, and at least one second electromechanical element. The central portion is configured to be subjected to a first force and a second force. A first frequency of the first force is lower than a second frequency of the second force. The at least one first sensing portion has a first natural frequency. The at least one first sensing portion is connected to the central portion. The second sensing portion has a second natural frequency. The second sensing portion is connected to the at least one first sensing portion and connected to the at least one fixing portion. The at least one first electromechanical element is disposed on the at least one first sensing portion and configured to measure a first vibration amplitude of the at least one first sensing portion. The at least one second electromechanical element is disposed on the second sensing portion and configured to measure a second vibration amplitude of the second sensing portion. When the central portion is subjected to the first force, the first vibration amplitude is larger than the second vibration amplitude. When the central portion is subjected to the second force, the first vibration amplitude is smaller than the second vibration amplitude.

DETAILED DESCRIPTION

Figure 1:
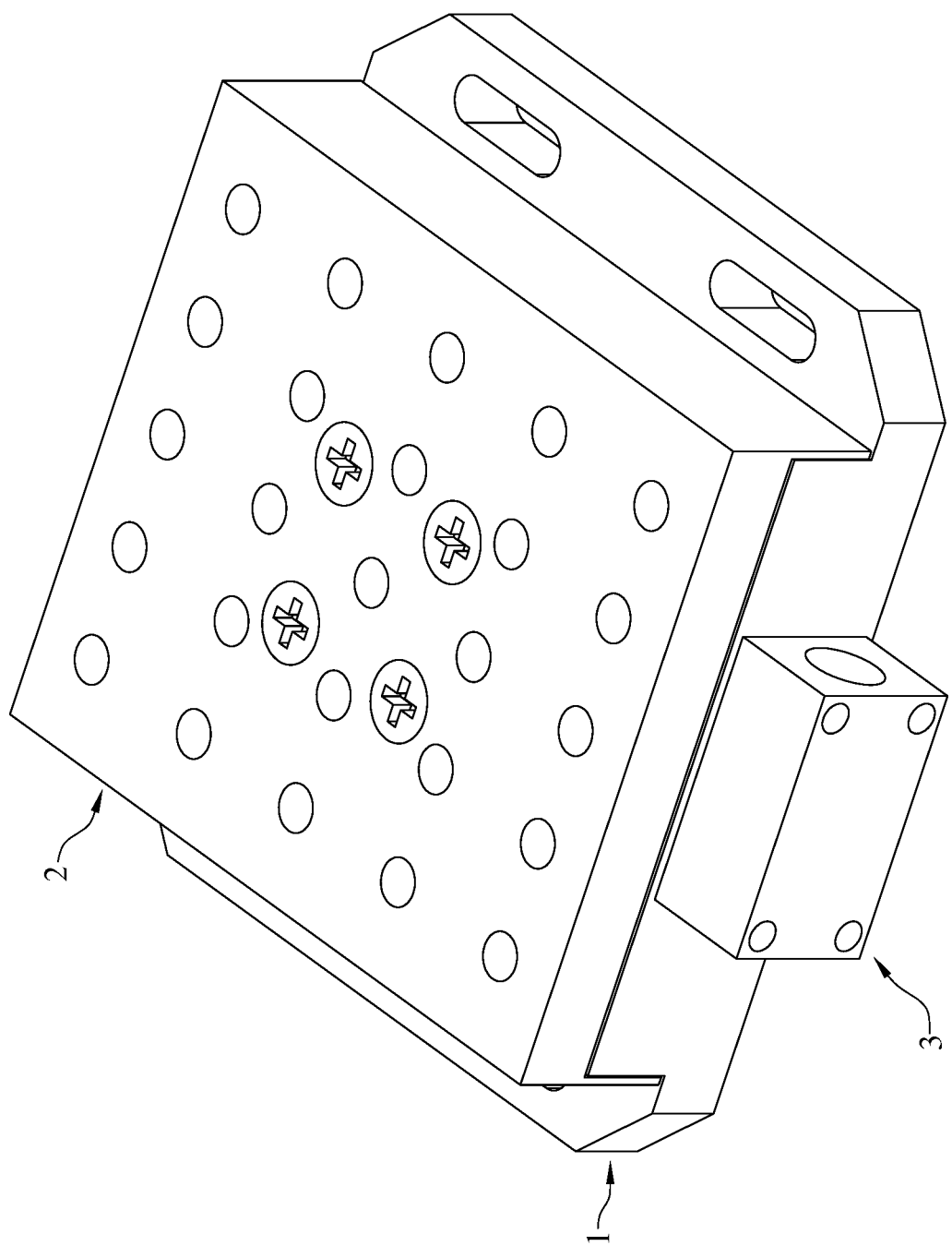
FIG. 1 illustrates a perspective view of a machining system according to one embodiment of the disclosure.

In the following detailed description, numerous specific details are set forth to provide a thorough understanding of exemplary embodiments of the disclosure. It will be apparent, however, that one or more exemplary embodiments may be practiced without these specific details.

In addition, for the purpose of clear and simple illustration, the size or ratio of the features shown in the drawings of the present disclosure may be exaggerated, but the present disclosure is not limited thereto. And various changes can be made as long as it does not depart from the spirit of the disclosure. Further, spatial terms, such as "on", "below", "front", "rear", "above" are for illustration and not intended to limit the disclosure.

Figure 2:
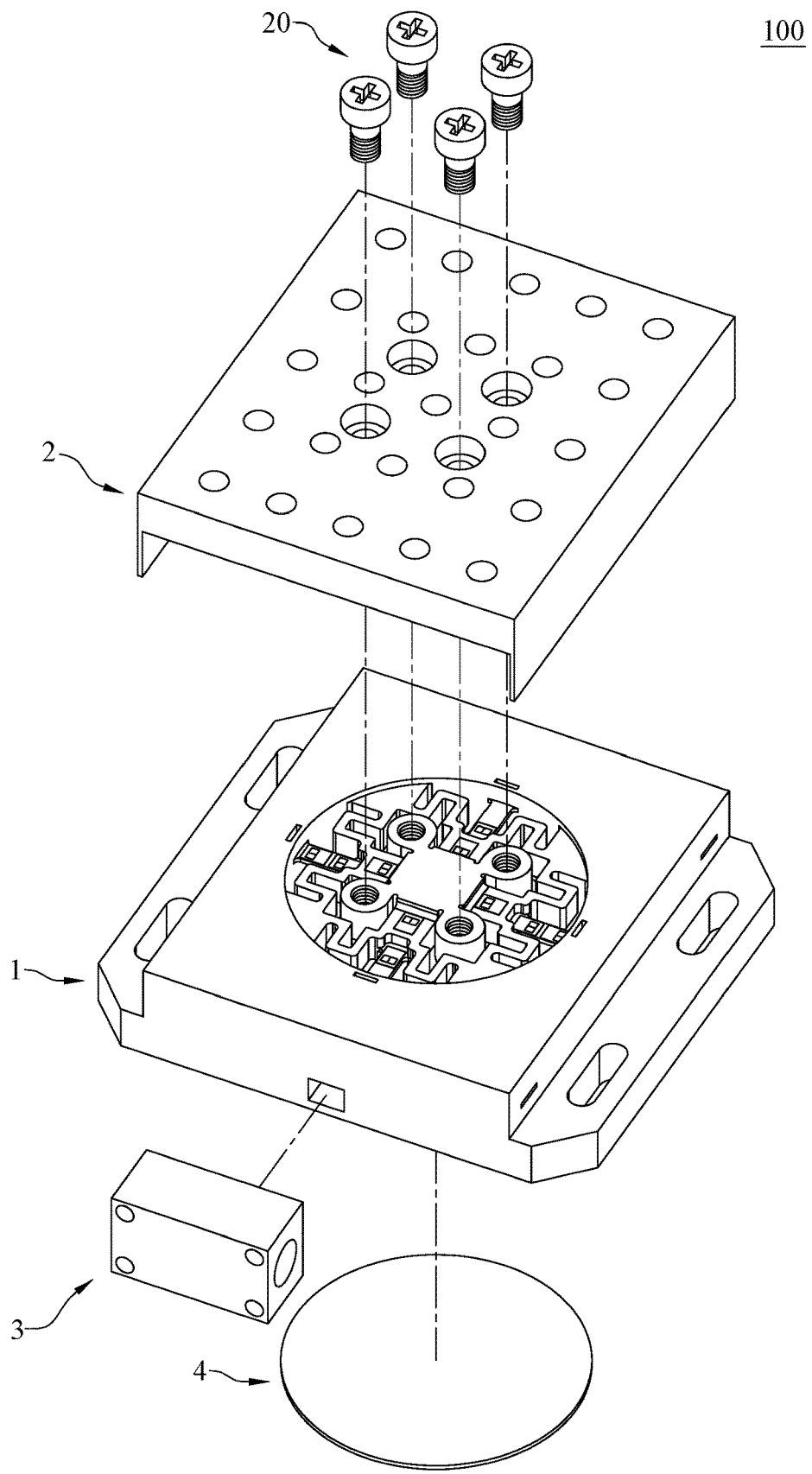
FIG. 2 illustrates a perspective exploded view of the machining system in FIG. 1.

Please refer to FIG. 1 and FIG. 2, FIG. 1 illustrates a perspective view of a machining system 100 according to one embodiment of the disclosure, and FIG. 2 illustrates a perspective exploded view of the machining system 100 in FIG. 1.

In this embodiment, the machining system 100 includes a force measurement device 1, a workpiece fixture 2, a signal processor 3, and a base 4. The force measurement device 1 is able to measure low-frequency force and high-frequency force. The workpiece fixture 2 can be is fixed on the force measurement device 1 via a plurality of screws 20. The signal processor 3 is disposed on a side of the force measurement device 1 and is electrically connected to the force measurement device 1. The base 4 is disposed at the bottom of the force measurement device 1.

The workpiece fixture 2 is configured to support or hold a workpiece to be machined. When the workpiece held on the workpiece fixture 2 is being machined, the machining forces applied on the workpiece is transmitted to the workpiece fixture 2, and the forces applied on the workpiece fixture 2 is transmitted to the force measurement device 1. The force measurement device 1 is able to measure the forces applied thereto and to output associated signals. The signal processor 3 is configured to process the signals from the force measurement device 1 so as to determine the type or magnitude of the forces applied to the force measurement device 1, such that a control center is able to timely monitor the forces (e.g., the cutting force and feeding force) that the workpiece is subjected to so as to obtain key information on the variations of the forces needed for the basis of the later compensation control and condition analysis or diagnosis.

Figure 3:
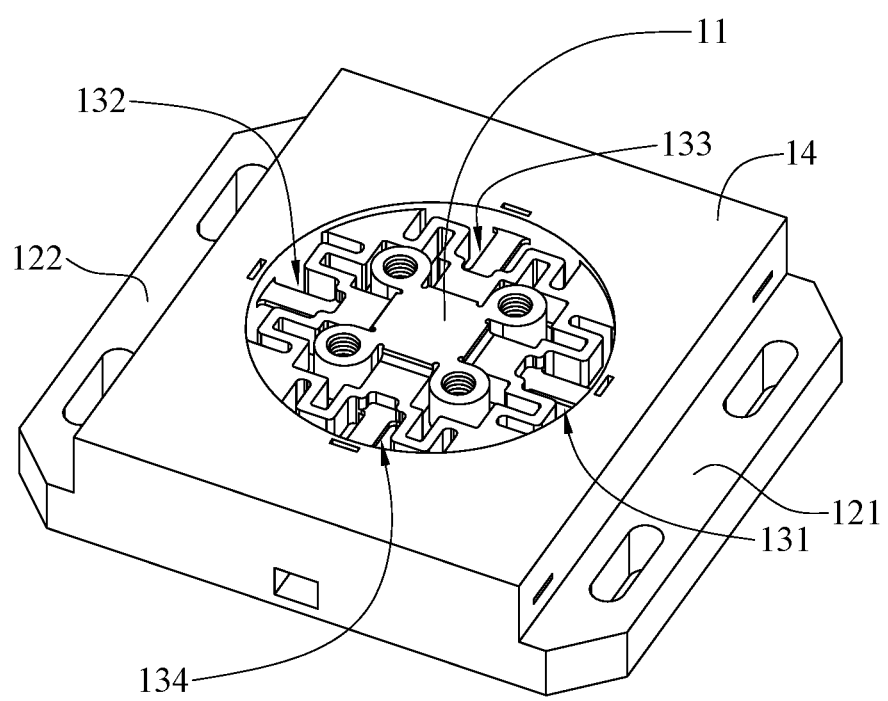
FIG. 3 illustrates a perspective view of a force measurement device of the machining system in FIG. 2.
Figure 4:
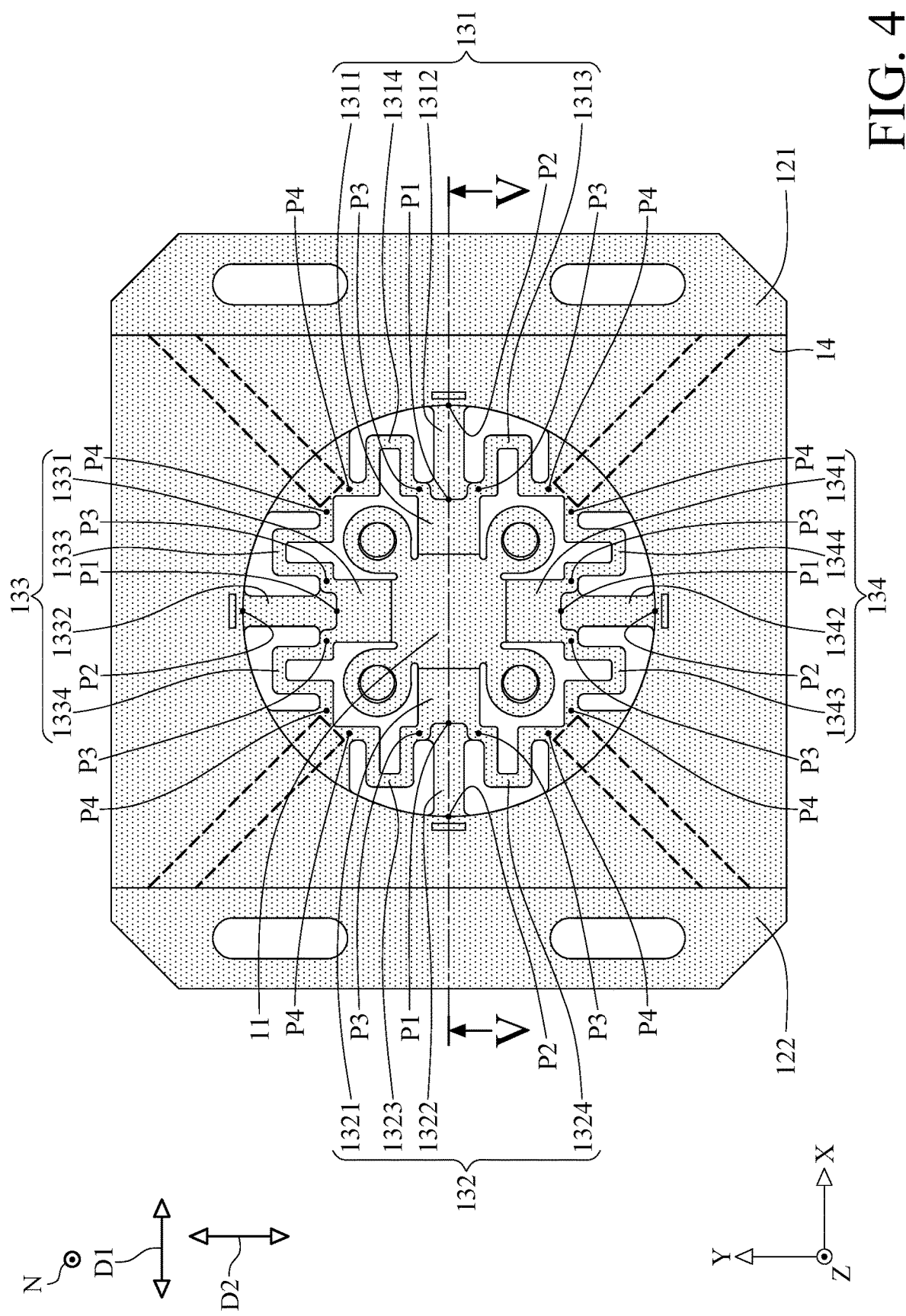
FIG. 4 illustrates a top view of the force measurement device in FIG. 3.
Figure 5:
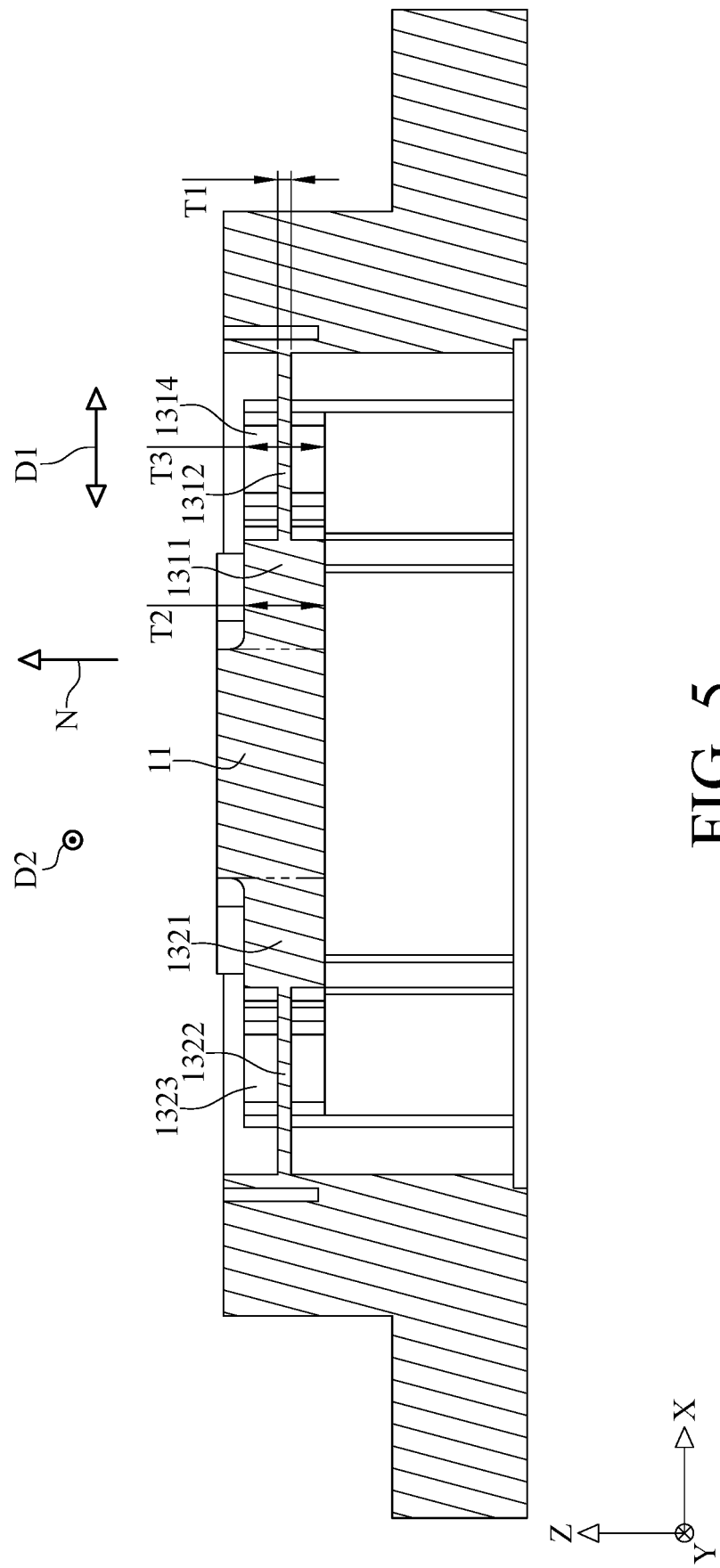
FIG. 5 illustrates a cross-sectional view of the force measurement device taken along line V-V in FIG. 4.

Please refer to FIG. 2, FIG. 3, FIG. 4, and FIG. 5, where FIG. 3 illustrates a perspective view of the force measurement device 1 of the machining system 100 in FIG. 2, FIG. 4 illustrates a top view of the force measurement device 1 in FIG. 3, and FIG. 5 illustrates a cross-sectional view of the force measurement device 1 taken along line V-V in FIG. 4.

As shown in FIG. 2 and FIG. 3, the force measurement device 1 includes a central portion 11, a plurality of fixing portions 121 and 122, a plurality of first sensing portions 131, 132, 133, and 134, and a second sensing portion 14. The first sensing portions 131, 132, 133, and 134 are connected to the central portion 11. The second sensing portion 14 is in a shape surrounding the central portion 11. As shown, in one exemplary embodiment, the second sensing portion 14 may have a quadrilateral contour with a circular-shaped hollow portion for accommodating the central portion 11. The second sensing portion 14 is connected to the first sensing portions 131, 132, 133, and 134. The fixing portion 121 and 122 are respectively connected to two opposite sides of the second sensing portion 14. In response to a force or a torque applied to the central portion 11, the first sensing portions 131, 132, 133, and 134 will have a first vibration amplitude at a first vibrational frequency, and the second sensing portion 14 will have a second vibration amplitude at a second vibrational frequency. In this embodiment, the central portion 11, the fixing portions 121 and 122, the first sensing portions 131, 132, 133, and 134, and the second sensing portion 14 are integrally formed into a single piece, but the disclosure is not limited thereto. In addition, as long as the second sensing portion 14 is in a shape surrounding the central portion 11, the shapes of its outer edges and inner edges are not particularly limited to be polygon or circle.

As shown in FIG. 4 and FIG. 5, the relationships among the central portion 11, the fixing portions 121 and 122, the first sensing portions 131, 132, 133, and 134, and the second sensing portion 14 of the force measurement device 1 in FIG. 2 are described in detail.

In this embodiment, a normal vector N of the central portion 11 is parallel to Z-axis as shown. The first sensing portion 131 is located on positive X-axis of the central portion 11. The first sensing portion 131 includes a twistable portion 1311, an elastic portion 1312, and two supporting portions 1313 and 1314. The twistable portion 1311 is connected to the central portion 11. The elastic portion 1312 is located between the supporting portions 1313 and 1314. An inner endpoint P1 of the elastic portion 1312 is connected to the twistable portion 1311 along a first direction D1, and an outer endpoint P2 of the elastic portion 1312 is connected to the second sensing portion 14 along the first direction D1. The first direction D1 is perpendicular to the normal vector N of the central portion 11 and parallel to X-axis as shown. Each of the supporting portions 1313 and 1314 has an inner endpoint P3 connected to the twistable portion 1311, and each of the supporting portions 1313 and 1314 has an outer endpoint P4 connected to the second sensing portion 14. In xy-plane, each of the supporting portions 1313 and 1314 is in serpentine structure. When the central portion 11 is subjected to a torque TX parallel to the first direction D1, the supporting portions 1313 and 1314 are able to reduce the torque being transmitted to the elastic portion 1312, which makes the elastic portion 1312 obtain a more precise measurement of an axial force FX parallel to the first direction D1. A thickness T1 of the elastic portion 1312 in Z-axis is smaller than a thickness T2 of the twistable portion 1311 in Z-axis and is also smaller than a thickness T3 of each of the supporting portions 1313 and 1314 in Z-axis. This configuration is able to improve the sensitivity in measuring various forces. For example, when the central portion 11 is subjected to an axial force parallel to the first direction D1, the thickness T2 of the elastic portion 1312 is relatively small so that the elastic portion 1312 would have a larger strain in the first direction D1. As such, the sensitivity that the elastic portion 1312 measures the force in the first direction D1 is improved. In addition, when the central portion 11 is subjected to an axial force parallel to the first direction D1, a strain of the twistable portion 1311 in the first direction D1 is smaller than a strain of the elastic portion 1312 in the first direction D1, such that the impact of the axial force on the twistable portion 1311 can be reduced.

The first sensing portion 132 is located on the negative X-axis of the central portion 11. The first sensing portion 132 includes a twistable portion 1321, an elastic portion 1322, and two supporting portions 1323 and 1324. In addition, the first sensing portion 132 and the first sensing portion 131 are substantially the same or similar in structure, and the first sensing portion 132 and the first sensing portion 131 are arranged symmetrically relative to a line that passes through the center of the central portion 11 and is parallel to Y-axis, thus the details of the first sensing portion 132 are not repeated hereinafter.

The first sensing portion 133 is located on the positive Y-axis of the central portion 11. The first sensing portion 133 includes a twistable portion 1331, an elastic portion 1332, and two supporting portions 1333 and 1334. An inner endpoint P1 of the elastic portion 1332 is connected to the twistable portion 1331 along a second direction D2, and an outer endpoint P2 of the elastic portion 1332 is connected to the second sensing portion 14 along the second direction D2. The second direction D2 is perpendicular to the first direction D1 and the normal vector N of the central portion 11 and is parallel to Y-axis as shown. When the central portion 11 is subjected to a torque TY parallel to the second direction D2, the supporting portions 1333 and 1334 are able to disperse the torque being transmitted to the elastic portion 1332 to reduce the impact of the torque on the elastic portion 1332 and thereby making the elastic portion 1332 obtain a more precise measurement of an axial force FY parallel to the second direction D2. When the central portion 11 is subjected to an axial force FY parallel to the second direction D2, a strain of the twistable portion 1331 in the second direction D2 is smaller than a strain of the elastic portion 1332 in the second direction D2. In addition, the first sensing portion 133 is substantially the same as or similar to the first sensing portions 131 and 132, thus the first sensing portion 133 is not described in detail hereinafter.

The first sensing portion 134 is located on the negative Y-axis of the central portion 11. The first sensing portion 134 includes a twistable portion 1341, an elastic portion 1342, and two supporting portions 1343 and 1344. In addition, the first sensing portion 134 is substantially the same as or similar to the first sensing portions 131, 132, and 133, thus the first sensing portion 134 is not described in detail hereinafter.

The central portion 11 can be subjected to a first force and a second force at the same time. The first force has a first frequency f1, and the second force has a second frequency f2, wherein the first frequency f1 of the first force is less than the second frequency f2 of the second force. When the force measurement device 1 is applied to a specific machining apparatus, the stiffness or mass of the first sensing portions 131, 132, 133, and 134 and the stiffness or mass of the second sensing portion 14 may be adjusted to make a first natural frequency fn1 of the first sensing portions 131, 132, 133, and 134 close to the first frequency f1 of the first force and to make a second natural frequency fn2 of the second sensing portion 14 close to the second frequency f2 of the second force. By this adjustment, when the central portion 11 is subjected to the first force of the first frequency f1, the first vibrational frequency generated by the first sensing portions 131, 132, 133, and 134 in response to the first force will be substantially equivalent to the first natural frequency fn1 of the first sensing portions 131, 132, 133, and 134, and when the central portion 11 is subjected to the second force of the second frequency f2, the second vibrational frequency generated by the second sensing portion 14 in response to the second force will be substantially equivalent to the second natural frequency fn2 of the second sensing portion 14. As such, the first sensing portions 131, 132, 133, and 134 and the first force will have a natural resonance and therefore produce a large first vibration amplitude, and the second sensing portion 14 and the second force will have a natural resonance and therefore produce a large second vibration amplitude. As a result, both the precision and sensitivity that the force measurement device 1 measures the first force (e.g., feeding force) and the second force (e.g., cutting force) are improved. In some embodiments where the machining processes are performed on different machining apparatuses, the first natural frequency of the first sensing portions 131, 132, 133, and 134 may range from 1 Hz to 10 Hz, and the second natural frequency of the second sensing portion 14 may range from 10 Hz to 8000 Hz.

In one embodiment, when the force measurement device 1 is applied to a cutting machine, the first force may be a low-frequency feeding force (frequency is f1) for processing the workpiece, and the second force may be a high-frequency cutting force (frequency is f2) for processing the workpiece. Since the first sensing portions 131, 132, 133, and 134 are structures with low stiffness and the second sensing portion 14 is a structure with high stiffness (i.e., the stiffness of the first sensing portions 131, 132, 133, and 134 is less than the stiffness of the second sensing portion 14), the second natural frequency fn2 of the second sensing portion 14 may be greatly higher than the first natural frequency fn1 of the first sensing portions 131, 132, 133, and 134. As such, when the force measurement device 1 is simultaneously subjected to a low-frequency feeding force and a high-frequency cutting force, it would be easy to distinguish the first vibration amplitude of the first sensing portions 131, 132, 133 and 134 from the second vibration amplitude of the second sensing portion 14. More specifically, when the stiffness of the first sensing portions 131, 132, 133, and 134 is less than the stiffness of the second sensing portion 14, the first natural frequency fn1 of the first sensing portions 131, 132, 133, and 134 where the first vibration amplitude occurs falls within a relatively low-frequency range, such as 1 Hz to 10 Hz, and the second natural frequency fn2 of second sensing portion 14 where the second vibration amplitude occurs falls within a relatively high-frequency range, such as 10 Hz to 8000 Hz.

In the disclosure, the structure and shape of the first sensing portions 131, 132, 133, and 134 with low stiffness and the structure and shape of the second sensing portion 14 with high stiffness are not particularly restricted. For example, in a not illustrated embodiment, the second sensing portion 14 may be a square structure that can surround the central portion 11, and the first sensing portions 131, 132, 133, and 134 may each be a straight structure connected to and located between the central portion 11 and the second sensing portion 14. In another illustrated embodiment, the second sensing portion 14 may be a cuboid, and the first sensing portions 131, 132, 133, and 134 may each be a hollow column connected to and located between the central portion 11 and the second sensing portion 14. In addition, the first sensing portions 131, 132, 133, and 134 may each have one or more recesses or through holes, such that the stiffness of the first sensing portions 131, 132, 133, and 134 may be less than the stiffness of the second sensing portion 14. In this embodiment, the second sensing portion 14 is in a structure that can surround the central portion 11, but the contours of the outer and inner edges of the structure are not particularly restricted and may be polygon or circle.

When the central portion 11 is subjected to a first force which is a low-frequency feeding force, adjusting the stiffness of the first sensing portions 131, 132, 133, and 134 (e.g., changing the thickness of the first sensing portions 131, 132, 133, and 134 along Z-axis) and adjusting the stiffness of the second sensing portion 14 (e.g., changing the size of cross-sectional area of the second sensing portion 14 along the first direction D1) can make the first natural frequency fn1 of the first sensing portions 131, 132, 133, and 134 close to the frequency f1 of the low-frequency feeding force and also make the second natural frequency fn2 of the second sensing portion 14 away from the frequency f1 of the low-frequency feeding force. By doing so, a large first vibration amplitude of the first sensing portions 131, 132, 133, and 134 is caused by the low-frequency feeding force. On the other hand, since the second natural frequency fn2 of the second sensing portion 14 is away from the frequency f1 of the low-frequency feeding force, a large second vibration amplitude of the second sensing portion 14 caused by the low-frequency feeding force is unable to occur. Further adjusting the stiffness of the second sensing portion 14 can make the second natural frequency fn2 of the second sensing portion 14 further away from the first frequency f1 of the low-frequency feeding force, thereby making the first vibration amplitude of the first sensing portions 131, 132, 133, and 134 caused by the low-frequency feeding force larger than the second vibration amplitude of the second sensing portion 14 caused by the low-frequency feeding force. Preferably adjusting the stiffness of the first sensing portions 131, 132, 133, and 134 can make a first natural frequency fn1 of the first sensing portions 131, 132, 133, and 134 substantially equivalent to the frequency f1 of the low-frequency feeding force. Accordingly, when the central portion 11 is subjected to a low-frequency feeding force, the first vibration amplitude may be amplified with the help of the phenomenon of natural resonance of the first sensing portions 131, 132, 133, and 134 and thereby optimizing the measurement sensitivity of the first sensing portions 131, 132, 133, and 134.

When the central portion 11 is subjected to a second force which is a high frequency cutting force, adjusting the stiffness of the first sensing portions 131, 132, 133, and 134 and adjusting the stiffness of the second sensing portion 14 can make the first natural frequency fn1 of the first sensing portions 131, 132, 133, and 134 away from the frequency f2 of the high-frequency cutting force and also make the second natural frequency fn2 of the second sensing portion 14 close to the frequency f2 of the high-frequency cutting force. By doing so, a large second vibration amplitude of the second sensing portion 14 is caused by the high frequency cutting force. On the other hand, since the first natural frequency fn1 of the first sensing portions 131, 132, 133, and 134 is away from the frequency f2 of the high-frequency cutting force, a large first vibration amplitude of the first sensing portions 131, 132, 133, and 134 caused by the high frequency cutting force is unable to occur. Further adjusting the stiffness of the first sensing portions 131, 132, 133, and 134 can make the first natural frequency fn1 of the first sensing portions 131, 132, 133, and 134 further away from the second frequency f2 of the high-frequency cutting force, thereby making the first vibration amplitude of the first sensing portions 131, 132, 133, and 134 caused by the high-frequency cutting force smaller than the second vibration amplitude of the second sensing portion 14 caused by the high-frequency cutting force. Preferably adjusting the stiffness of the second sensing portion 14 can make a second natural frequency fn2 of the second sensing portion 14 substantially equivalent to the frequency f2 of the high-frequency cutting force. Accordingly, when the central portion 11 is subjected to a high-frequency cutting force, the second vibration amplitude may be amplified with the help of the phenomenon of natural resonance of the second sensing portion 14 and thereby optimizing the measurement sensitivity of the second sensing portion 14.

When the central portion 11 is simultaneously subject to a first force which is a low-frequency feeding force and a second force which is a high-frequency cutting force, adjusting the stiffness of the first sensing portions 131, 132, 133, and 134 and the stiffness of the second sensing portion 14 can make the first natural frequency fn1 of the first sensing portions 131, 132, 133, and 134 close to the frequency f1 of the low-frequency feeding force and also make the second natural frequency fn2 of the second sensing portion 14 close to the frequency f2 of the high-frequency cutting force. By doing so, when the central portion 11 is simultaneously subject to the first force and the second force, a large first vibration amplitude of the first sensing portions 131, 132, 133, and 134 occurs, and a large second vibration amplitude of the second sensing portion 14 also occurs. Preferably adjusting the stiffness of the first sensing portions 131, 132, 133, and 134 and the stiffness of the second sensing portion 14 can make a first natural frequency fn1 of the first sensing portions 131, 132, 133, and 134 substantially equivalent to the frequency f1 of the low-frequency feeding force and make the second natural frequency fn2 of the second sensing portion 14 substantially equivalent to the frequency f2 of the high-frequency cutting force. Accordingly, when the central portion 11 is simultaneously subject to a low-frequency feeding force and a high-frequency cutting force, the first vibration amplitude may be amplified with the help of the phenomenon of natural resonance of the first sensing portions 131, 132, 133, and 134 and the second vibration amplitude may be amplified with the help of the phenomenon of natural resonance of the second sensing portion 14, thereby optimizing the measurement sensitivity of the first sensing portions 131, 132, 133, and 134 and the measurement sensitivity of the second sensing portion 14.

Figure 6:
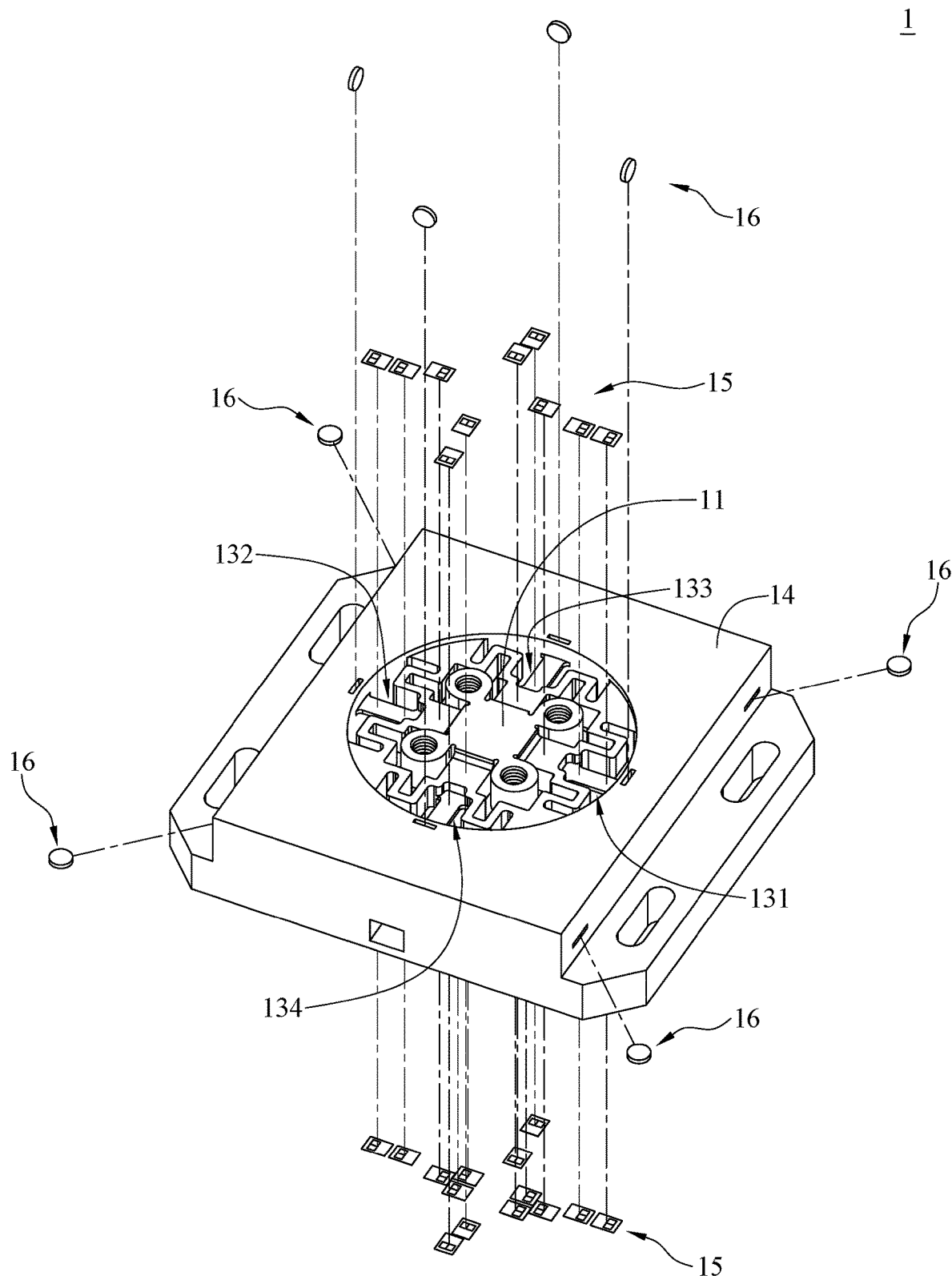
FIG. 6 illustrates a perspective exploded view of the force measurement device of the machining system in FIG. 2.
Figure 7:
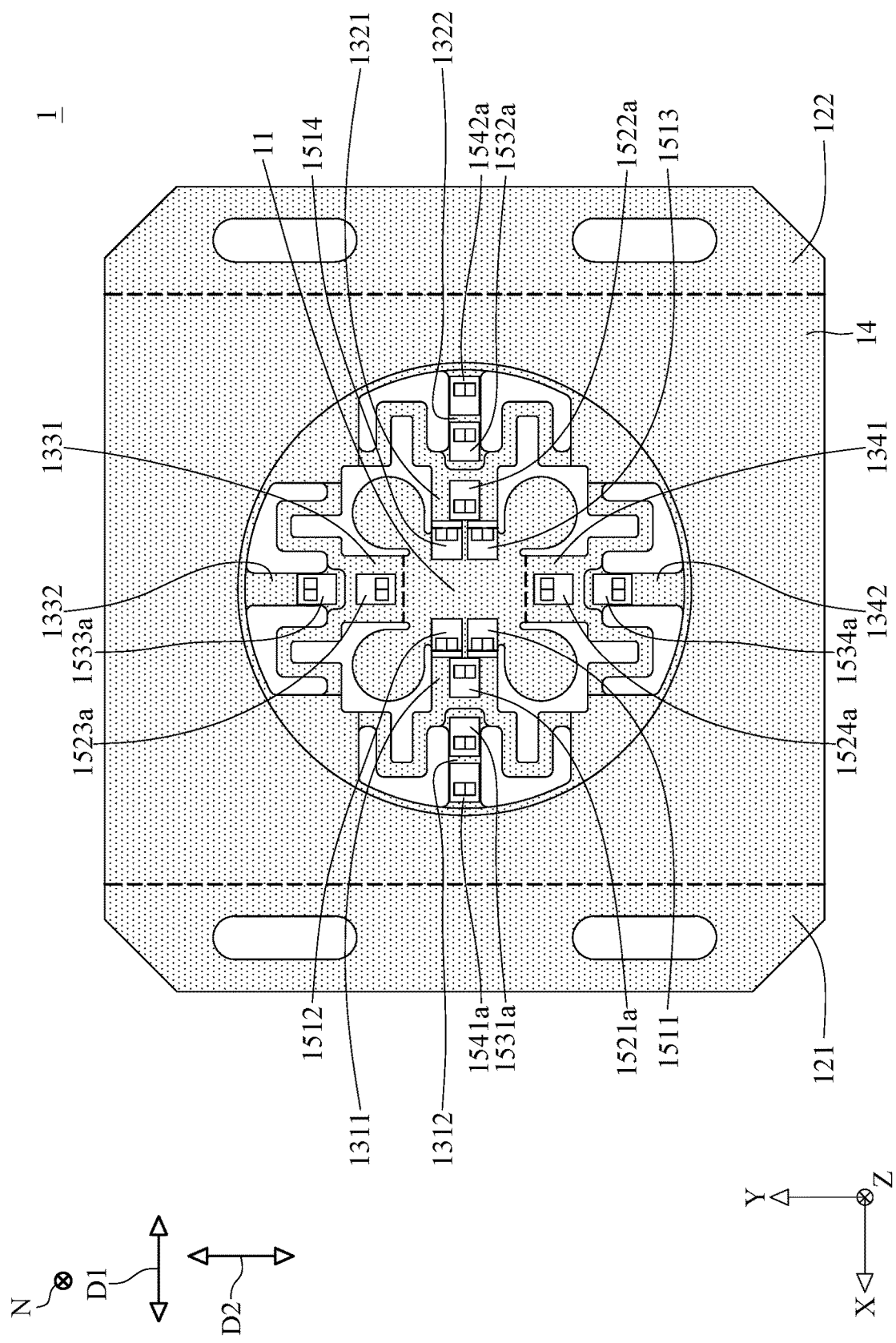
FIG. 7 illustrates a bottom view of the force measurement device in FIG. 6.
Figure 8:
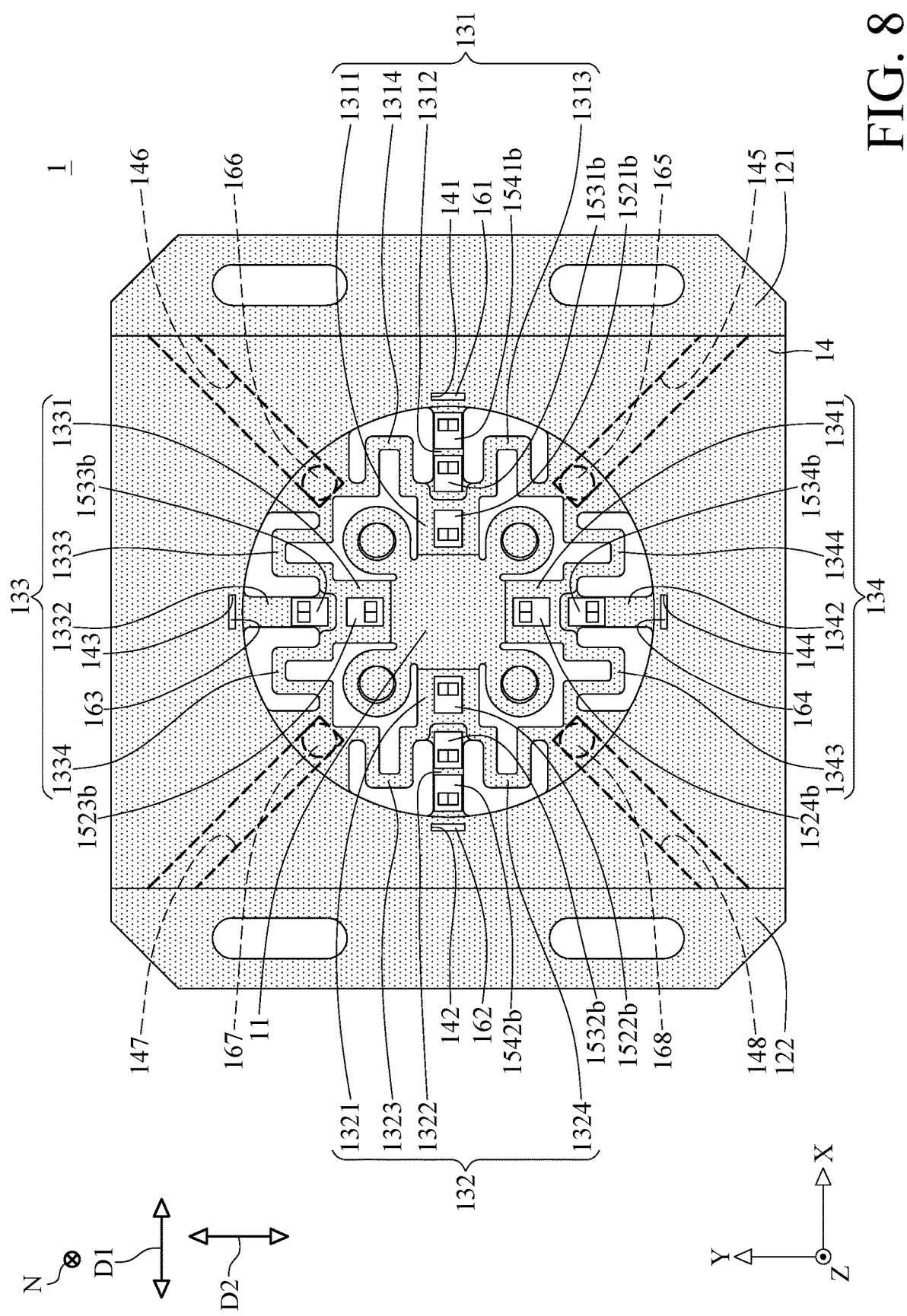
FIG. 8 illustrates a top view of the force measurement device in FIG. 6.

Referring to FIG. 6, FIG. 7, and FIG. 8, wherein FIG. 6 illustrates a perspective exploded view of the force measurement device of the machining system in FIG. 2, FIG. 7 illustrates a bottom view of the force measurement device 1 in FIG. 6, and FIG. 8 illustrates a top view of the force measurement device 1 in FIG. 6. As shown in FIG. 6, the force measurement device 1 further includes a plurality of first electromechanical elements 15 and a plurality of second electromechanical elements 16. The first electromechanical elements 15 are disposed on the first sensing portions 131, 132, 133, and 134 and are configured to measure a first vibration amplitude of the first sensing portions 131, 132, 133, and 134. The second electromechanical elements 16 are disposed on the second sensing portion 14 and are configured to measure a second vibration amplitude of the second sensing portion 14.

When the central portion 11 is subjected to a first force which is, for example, a low-frequency feeding force, the first vibration amplitude may be amplified with the help of the phenomenon of natural resonance of the first sensing portions 131, 132, 133, and 134, such that the first electromechanical element 15 generates a stronger first electric signal and thus optimizing the measurement sensitivity of the first sensing portions 131, 132, 133, and 134. When the central portion 11 is subjected to a second force which is, for example, a high-frequency cutting force, the second vibration amplitude may be amplified with the help of the phenomenon of natural resonance of the second sensing portion 14, such that the second electromechanical element 16 generates a stronger second electric signal and thus optimizing the measurement sensitivity of the second sensing portion 14. When the central portion 11 is simultaneously subjected to the first force and the second force, the first vibration amplitude and the second vibration amplitude may be amplified simultaneously, such that the first electromechanical element 15 generates a stronger first electric signal and the second electromechanical element 16 generates a stronger second electric signal and thus simultaneously optimizing the measurement sensitivity of the first sensing portions 131, 132, 133, and 134 and the measurement sensitivity of the second sensing portion 14.

FIG. 7 and FIG. 8 illustrate the detail of the first electromechanical elements 15 in FIG. 6 disposed on the first sensing portions 131, 132, 133, and 134 and illustrate the detail of the second electromechanical elements 16 disposed on the second sensing portion 14. The first electromechanical element 15 may be a piezoresistance element. The first electromechanical elements 15 include first electromechanical elements 1511, 1512, 1513, 1514, 1521a, 1521b, 1522a, 1522b, 1523a, 1523b, 1524a, 1524b, 1531a, 1531b, 1532a, 1532b, 1533a, 1533b, 1534a, 1534b, 1541a, 1541b, 1542a, and 1542b. The second electromechanical elements 16 may be a piezoelectricity element. The second electromechanical elements 16 include second electromechanical elements 161, 162, 163, 164, 165, 166, 167, and 168.

As shown in FIG. 7, the first electromechanical elements 1511 and 1512 are arranged parallel to each other along Y-axis and are disposed on a junction between the central portion 11 and the twistable portion 1311. The first electromechanical elements 1513 and 1514 are arranged parallel to each other along Y-axis and are disposed on a junction between the central portion 11 and the twistable portion 1321.

The first electromechanical elements 1511, 1512, 1513, and 1514 are configured to measure a torque that the central portion 11 is subjected to and is parallel to the normal vector N of the central portion 11, where the torque may be referred to as a torque TZ along Z-axis. When the location measured by the first electromechanical elements 1511 and 1514 is in a compressed status, and the location measured by the first electromechanical elements 1512 and 1513 is in a stretched status, the central portion 11 may be subjected to a torque along positive Z-axis. On the other hand, when the location measured by the first electromechanical elements 1511 and 1514 is in a stretched status and the location measured by the first electromechanical elements 1512 and 1513 is in a compressed status, the central portion 11 may be subjected to a torque along negative Z-axis. When the above statuses slowly and alternately appear, which means that the central portion 11 is subjected to a torque with low frequency along Z-axis. In other words, the central portion 11 is subjected to a torque along positive Z-axis and a torque along negative Z-axis within a relatively long period of time.

As shown in FIG. 7, the first electromechanical element 1521a is disposed on a surface of the twistable portion 1311 facing towards negative Z-axis and is located adjacent to the central portion 11. The first electromechanical element 1522a is disposed on a surface of the twistable portion 1321 facing towards negative Z-axis and is located adjacent to the central portion 11. As shown in FIG. 8, the first electromechanical element 1521b is disposed on a surface of the twistable portion 1311 facing towards positive Z-axis and is located adjacent to the central portion 11. The first electromechanical element 1522b is disposed on a surface of the twistable portion 1321 facing towards positive Z-axis and is located adjacent to the central portion 11.

As shown in FIG. 7 and FIG. 8, the first electromechanical elements 1521a, 1522a, 1521b, and 1522b are configured to measure a torque that the central portion 11 is subjected to and is parallel to the second direction D2, where the torque may be referred to as a torque TY along Y-axis. When the location measured by the first electromechanical elements 1522a and 1521b is in a compressed status and the location measured by the first electromechanical elements 1521a and 1522b is in a stretched status, the central portion 11 may be subjected to a torque along positive Y-axis. On the other hand, when the location measured by the first electromechanical elements 1522a and 1521b is in a stretched status and the location measured by the first electromechanical elements 1521a and 1522b is in a compressed status, the central portion 11 may be subjected to a torque along negative Y-axis. When the above statuses slowly and alternately appear, which means that the central portion 11 is subjected to a torque with low frequency along Y-axis. In other words, the central portion 11 is subjected to a torque along positive Y-axis and a torque along negative Y-axis within a relatively long period of time.

As shown in FIG. 7, the first electromechanical element 1523a is disposed on a surface of the twistable portion 1331 facing towards negative Z-axis and is located adjacent to the central portion 11. The first electromechanical element 1524a is disposed on a surface of the twistable portion 1341 facing towards negative Z-axis and is located adjacent to the central portion 11. As shown in FIG. 8, the first electromechanical element 1523b is disposed on a surface of the twistable portion 1331 facing towards positive Z-axis and is located adjacent to the central portion 11. The first electromechanical element 1524b is disposed on a surface of the twistable portion 1341 facing towards positive Z-axis and is located adjacent to the central portion 11.

As shown in FIG. 7 and FIG. 8, the first electromechanical elements 1523a, 1524a, 1523b, and 1524b are configured to measure a torque that the central portion 11 is subjected to and is parallel to the first direction D1, where the torque may be referred to as a torque TX along X-axis. When the location measured by the first electromechanical elements 1523a and 1524b themselves is in a compressed status and the location measured by the first electromechanical elements 1524a and 1523b is in a stretched status, the central portion 11 may be subjected to a torque along positive X-axis. On the other hand, when the location measured by the first electromechanical elements 1523a and 1524b measure is in a stretched status and the location measured by the first electromechanical elements 1524a and 1523b is in a compressed status, the central portion 11 may be subjected to a torque along negative X-axis. When the above statuses slowly and alternately appear, which means that the central portion 11 is subjected to a torque with low frequency along X-axis. In other words, the central portion 11 is subjected to a torque along positive X-axis and a torque along negative X-axis within a relatively long period of time.

As shown in FIG. 7, the first electromechanical element 1531a is disposed on a surface of the elastic portion 1312 facing towards negative Z-axis and is located adjacent to the twistable portion 1311. The first electromechanical element 1532a is disposed on a surface of the elastic portion 1322 facing towards negative Z-axis and is located adjacent to the twistable portion 1321. As shown in FIG. 8, the first electromechanical element 1531b is disposed on a surface of the elastic portion 1312 facing toward positive Z-axis and is located adjacent to the twistable portion 1311. The first electromechanical element 1532b is disposed on a surface of the elastic portion 1322 facing towards positive Z-axis and is located adjacent to the twistable portion 1321.

As shown in FIG. 7 and FIG. 8, the first electromechanical element 1531a, 1532a, 1531b, and 1532b are configured to measure an axial force that the central portion 11 is subjected to and is parallel to the first direction D1, where the axial force may be referred to as an axial force FX along X-axis. When the location measured by the first electromechanical elements 1531a and 1531b is in a compressed status and the location measured by the first electromechanical elements 1532a and 1532b is in a stretched status, the central portion 11 may be subjected to an axial force along positive X-axis. On the other hand, when the location measured by the first electromechanical elements 1531a and 1531b is in a stretched status and the location measured by the first electromechanical elements 1532a and 1532b is in a compressed status, the central portion 11 may be subjected to an axial force along negative X-axis. When the above statuses slowly and alternately appear, which means that the central portion 11 is subjected to an axial force with low frequency along X-axis. In other words, the central portion 11 is subjected to an axial force along positive X-axis and an axial force along negative X-axis within a relatively long period of time.

As shown in FIG. 7, the first electromechanical element 1533a is disposed on a surface of the elastic portion 1332 facing towards negative Z-axis and is located adjacent to the twistable portion 1331. The first electromechanical element 1534a is disposed on a surface of the elastic portion 1342 facing towards negative Z-axis and is located adjacent to the twistable portion 1341. As shown in FIG. 8, the first electromechanical element 1533b is disposed on a surface of the elastic portion 1332 facing towards positive Z-axis and is located adjacent to the twistable portion 1331. The first electromechanical element 1534b is disposed on a surface of the elastic portion 1342 facing towards positive Z-axis and is located adjacent to the twistable portion 1341.

As shown in FIG. 7 and FIG. 8, the first electromechanical elements 1533a, 1534a, 1533b, and 1534b are configured to measure an axial force that the central portion 11 is subjected to and is parallel to the second direction D2, where the axial force may be referred to as an axial force FY along Y-axis. When the location measured by the first electromechanical elements 1533a and 1533b is in a compressed status and the location measured by the first electromechanical elements 1534a and 1534b is in a stretched status, the central portion 11 may be subjected to an axial force along positive Y-axis. On the other hand, when the location measured by the first electromechanical elements 1533a and 1533b is in a stretched status and the location measured by the first electromechanical elements 1534a and 1534b is in a compressed status, the central portion 11 may be subjected to an axial force along negative Y-axis. When the above statuses slowly and alternately appear, which means that the central portion 11 is subjected to an axial force with low frequency along Y-axis. In other words, the central portion 11 is subjected to an axial force along positive Y-axis and an axial force along negative Y-axis within a relatively long period of time.

As shown in FIG. 7, the first electromechanical element 1541a is disposed on a surface of the elastic portion 1312 facing towards negative Z-axis and is located adjacent to the second sensing portion 14. The first electromechanical element 1542*a* is disposed on a surface of the elastic portion 1322 facing towards negative Z-axis and is located adjacent to the second sensing portion 14. As shown in FIG. 8, the first electromechanical element 1541*b* is disposed on a surface of the elastic portion 1312 facing towards positive Z-axis and is located adjacent to the second sensing portion 14. The first electromechanical element 1542*b* is disposed on a surface of the elastic portion 1322 facing towards positive Z-axis and is located adjacent to the second sensing portion 14.

As shown in FIG. 7 and FIG. 8, the first electromechanical elements 1541*a*, 1542*a*, 1541*b*, and 1542*b* are configured to measure an axial force that the central portion 11 is subjected to and is parallel to a normal vector N of the central portion 11, where the axial force may be referred to as an axial force FZ along Z-axis. When the location measured by the first electromechanical elements 1541*a* and 1542*a* is in a compressed status and the location measured by the first electromechanical elements 1541*b* and 1542*b* is in a stretched status, the central portion 11 may be subjected to an axial force along positive Z-axis. On the other hand, when the location measured by the first electromechanical elements 1541*a* and 1542*a* is in a stretched status and the location measured by the first electromechanical elements 1541*b* and 1542*b* is in a compressed status, the central portion 11 may be subjected to an axial force along negative Z-axis. When the above statuses slowly and alternately appear, which means that the central portion 11 is subjected to an axial force with low frequency along Z-axis. In other words, the central portion 11 is subjected to an axial force along positive Z-axis and an axial force along negative Z-axis within a relatively long period of time.

As shown in FIG. 8, the second electromechanical element 161 is disposed in a slot 141 of the second sensing portion 14 and is located adjacent to the elastic portion 1312, and the second electromechanical element 162 is disposed in a slot 142 of the second sensing portion 14 and is located adjacent to the elastic portion 1322.

The second electromechanical elements 161 and 162 are configured to measure an axial force that the central portion 11 is subjected to and is parallel to the first direction D1, where the axial force may be referred to as an axial force FX along X-axis. When the location measured by the second electromechanical element 161 is in a compressed status and the location measured by the second electromechanical element 162 is in a stretched status, the central portion 11 may be subjected to an axial force along positive X-axis. On the other hand, when the location measured by the second electromechanical element 161 is in a stretched status and the location measured by the second electromechanical element 162 is a compressed status, the central portion 11 may be subjected to an axial force along negative X-axis. When the above statuses fastly and alternately appear, which means that the central portion 11 is subjected to an axial force with high frequency along X-axis. In other words, the central portion 11 is subjected to an axial force along positive X-axis and an axial force along negative X-axis within a relatively short period of time.

As shown in FIG. 8, the second electromechanical element 163 is disposed in a slot 143 of the second sensing portion 14 and is located adjacent to the elastic portion 1332, and the second electromechanical element 164 is disposed in a slot 144 of the second sensing portion 14 and is located adjacent to the elastic portion 1342.

The second electromechanical elements 163 and 164 are configured to measure an axial force that the central portion 11 is subjected to and is parallel to the second direction D2, where the axial force may be referred to as an axial force FY along Y-axis. When the location measured by the second electromechanical element 163 is in a compressed status and the location measured by the second electromechanical element 164 is in a stretched status, the central portion 11 may be subjected to an axial force along positive Y-axis. On the other hand, when the location measured by the second electromechanical element 163 is in a stretched status and the location measured by the second electromechanical element 164 is in a compressed status, the central portion 11 may be subjected to an axial force along negative Y-axis. When the above statuses fastly and alternately appear, which means that the central portion 11 is subjected to an axial force with high frequency along Y-axis. In other words, the central portion 11 is subjected to an axial force along positive Y-axis and an axial force along negative Y-axis within a relatively short period of time.

In addition, the second electromechanical elements 161, 162, 163, and 164 are configured to measure a torque that the central portion 11 is subjected to and is parallel to the normal vector N of the central portion 11, where the torque may be referred to as a torque TZ along Z-axis. When the location measured by the second electromechanical elements 161, 162, 163, and 164 is in a stretched status, the central portion 11 may be subjected to a torque along positive Z-axis. When the location measured by the second electromechanical elements 161, 162, 163, and 164 is in a compressed status, the central portion 11 may be subjected to a torque along negative Z-axis. When the above statuses repeatedly appear, which means that the central portion 11 is subjected to a torque with high frequency along Z-axis. In other words, the central portion 11 is subjected to a torque along positive Z-axis and a torque along negative Z-axis within a relatively short period of time.

Further, the second electromechanical element 165 is disposed in a slot 145 of the second sensing portion 14 and is located adjacent to the supporting portion 1313 of the first sensing portion 131 and the supporting portion 1344 of the first sensing portion 134. The supporting portion 1313 and the supporting portion 1344 are located adjacent to each other. The second electromechanical element 166 is disposed in a slot 146 of the second sensing portion 14 and is located adjacent to the supporting portion 1314 of the first sensing portion 131 and the supporting portion 1333 of the first sensing portion 133. The supporting portion 1314 and the supporting portion 1333 are located adjacent to each other. The second electromechanical element 167 is disposed in a slot 147 of the second sensing portion 14 and is located adjacent to the supporting portion 1323 of the first sensing portion 132 and the supporting portion 1334 of the first sensing portion 133. The supporting portion 1323 and the supporting portion 1334 are located adjacent to each other. The second electromechanical element 168 is disposed in a slot 148 of the second sensing portion 14 and is located adjacent to the supporting portion 1324 of the first sensing portion 132 and the supporting portion 1343 of the first sensing portion 134. The supporting portion 1324 and the supporting portion 1343 are located adjacent to each other.

The second electromechanical elements 165, 166, 167, and 168 are configured to measure a torque that the central portion 11 is subjected to, such as a torque parallel to the first direction D1 (referred to as a torque TX along X-axis) or a torque parallel to the second direction D2 (referred to as a torque TY along Y-axis). In addition, the second electromechanical elements 165, 166, 167, and 168 also may be configured to measure an axial force that the central portion 11 is subjected to and is parallel to the normal vector N of the central portion 11, where the axial force may be referred to as an axial force FZ along Z-axis.

When the location measured by the second electromechanical elements 165 and 168 is in a compressed status and the location measured by the second electromechanical elements 166 and 167 is in a stretched status, the central portion 11 may be subjected to a torque TX along positive X-axis. On the other hand, when the location measured by the second electromechanical elements 165 and 168 is in a stretched status and the location measured by the second electromechanical elements 166 and 167 is in a compressed status, the central portion 11 may be subjected to a torque along negative X-axis. When the above statuses fastly and alternately appear, which means that the central portion 11 is subjected to a torque with high frequency along X-axis. In other words, the central portion 11 is subjected to a torque along positive X-axis and a torque along negative X-axis within a relatively short period of time.

When the location measured by the second electromechanical elements 165 and 166 is in a compressed status and the location measured by the second electromechanical elements 167 and 168 is in a stretched status, the central portion 11 may be subjected to a torque TY along positive Y-axis. On the other hand, when the location measured by the second electromechanical elements 165 and 166 is in a stretched status and the location measured by the second electromechanical elements 167 and 168 is in a compressed status, the central portion 11 may be subjected to a torque along negative Y-axis. When the above statuses fastly and alternately appear, which means that the central portion 11 is subjected to a torque with high frequency along Y-axis. In other words, the central portion 11 is subjected to a torque along positive Y-axis and a torque along negative Y-axis within a relatively short period of time.

When the location measured by the second electromechanical elements 165, 166, 167, and 168 is in a stretched status, the central portion 11 may be subjected to an axial force FZ along positive Z-axis. On the other hand, when the location measured by the second electromechanical elements 165, 166, 167, and 168 is in a compressed status, the central portion 11 may be subjected to an axial force along negative Z-axis. When the above statuses fastly and alternately appear, which means that the central portion 11 is subjected to an axial force with high frequency along Z-axis. In other words, the central portion 11 is subjected to an axial force along positive Z-axis and an axial force along negative Z-axis within a relatively short period of time.

In addition, in other embodiments, the first electromechanical elements 1521b, 1522b, 1523b, 1524b, 1531b, 1532b, 1533b, 1534b, 1541b, and 1542b may be omitted according to actual requirements and the disclosure is not limited thereto.

According to the force measurement device as discussed in the above embodiments of the disclosure, when the central portion is subjected to a first force with low frequency, a relatively large first vibration amplitude of the first sensing portion occurs so that the sensitivity in measuring the first force is improved. In addition, regarding the force measurement device of one embodiment of the disclosure, when the central portion is subjected to a second force with high frequency, a relatively large second vibration amplitude of the second sensing portion occurs so that the sensitivity in measuring the second force is improved. Therefore, the force measurement device of one embodiment of the disclosure is able to accurately and simultaneously measure the first force with low frequency and the second force with high frequency to allow the control center to timely monitor the variations of the feeding force and cutting force occurring during machining process and to provide the basis of the later compensation control and condition analysis or diagnosis.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A force measurement device, comprising:
a central portion, configured to be subjected to a first force and a second force, wherein a first frequency of the first force is lower than a second frequency of the second force;
at least one fixing portion;
at least one first sensing portion, having a first natural frequency, wherein the at least one first sensing portion is connected to the central portion and comprises a twistable portion and an elastic portion, the twistable portion is connected to the central portion, an inner endpoint of the elastic portion is connected to the twistable portion along a first direction, an outer endpoint of the elastic portion is connected to the second sensing portion along the first direction, and a thickness of the elastic portion is smaller than a thickness of the twistable portion;
a second sensing portion, having a second natural frequency, wherein the second sensing portion is connected to the at least one first sensing portion and connected to the at least one fixing portion and is not directly connected to the central portion;
at least one first electromechanical element, disposed on the at least one first sensing portion and configured to measure a first vibration amplitude of the at least one first sensing portion; and
at least one second electromechanical element, disposed on the second sensing portion and configured to measure a second vibration amplitude of the second sensing portion;
wherein when the central portion is subjected to the first force, the first vibration amplitude is larger than the second vibration amplitude; when the central portion is subjected to the second force, the first vibration amplitude is smaller than the second vibration amplitude.

2. The force measurement device according to claim 1, wherein when the central portion is subjected to the first force, a first vibrational frequency generated by the at least one first sensing portion in response to the first force is substantially equivalent to the first natural frequency.

3. The force measurement device according to claim 1, wherein when the central portion is subjected to the second force, a second vibrational frequency generated by the second sensing portion in response to the second force is substantially equivalent to the second natural frequency.

4. The force measurement device according to claim 1, wherein when the central portion is subjected to the first force and the second force, a first vibrational frequency generated by the at least one first sensing portion is substantially equivalent to the first natural frequency, and a second vibrational frequency generated by the second sensing portion is substantially equivalent to the second natural frequency.

5. The force measurement device according to claim 1, wherein a stiffness of the at least one first sensing portion is lower than a stiffness of the second sensing portion.

6. The force measurement device according to claim 1, wherein the at least one first electromechanical element is a piezoresistance element.

7. The force measurement device according to claim 1, wherein the at least one second electromechanical element is a piezoelectricity element.

8. The force measurement device according to claim 1, wherein the at least one first sensing portion comprises two supporting portions, the elastic portion is located between the two supporting portions, the first direction is perpendicular to a normal vector of the central portion, the inner endpoints of the supporting portions are connected to the twistable portion, the outer endpoints of the supporting portions are connected to the second sensing portion, when the central portion is subjected to an axial force parallel to the first direction, a strain of the twistable portion along the first direction is smaller than a strain of the elastic portion along the first direction.

9. The force measurement device according to claim 8, wherein the thickness of the elastic portion is smaller than a thickness of each of the supporting portions.

10. The force measurement device according to claim 8, wherein the at least one first electromechanical element is disposed on a junction between the central portion and the twistable portion.

11. The force measurement device according to claim 10, wherein the at least one first electromechanical element is configured to measure a torque that the central portion is subjected to and is parallel to the normal vector of the central portion.

12. The force measurement device according to claim 8, wherein the at least one first electromechanical element is disposed on the twistable portion and is located adjacent to the central portion.

13. The force measurement device according to claim 12, wherein a quantity of the at least one first electromechanical element is plural, the first electromechanical elements are configured to measure a torque that the central portion is subjected to and is parallel to a second direction, wherein the second direction is perpendicular to the first direction and the normal vector of the central portion.

14. The force measurement device according to claim 8, wherein the at least one first electromechanical element is disposed on the elastic portion and is located adjacent to the twistable portion.

15. The force measurement device according to claim 14, wherein the at least one first electromechanical element configured to measure the axial force that the central portion is subjected to and is parallel to the first direction.

16. The force measurement device according to claim 8, wherein the at least one first electromechanical element is disposed on the elastic portion and is located adjacent to the second sensing portion.

17. The force measurement device according to claim 16, wherein the at least one first electromechanical element configured to measure an axial force that the central portion is subjected to and is parallel to the normal vector of the central portion.

18. The force measurement device according to claim 8, wherein the at least one second electromechanical element is disposed on the second sensing portion and is located adjacent to the elastic portion.

19. The force measurement device according to claim 18, wherein the at least one second electromechanical element configured to measure the axial force that the central portion is subjected to and is parallel to the first direction.

20. The force measurement device according to claim 18, wherein the at least one second electromechanical element configured to measure a torque that the central portion is subjected to and is parallel to the normal vector of the central portion.

21. The force measurement device according to claim 8, wherein the at least one second electromechanical element is disposed on the second sensing portion and is located adjacent to at least one of the supporting portions.

22. The force measurement device according to claim 21, wherein a quantity of the at least one second electromechanical element is plural, and the second electromechanical elements are disposed on the second sensing portion and are located adjacent to the supporting portions, and the second electromechanical elements are configured to measure a torque that the central portion is subjected to and is parallel to the first direction.

23. The force measurement device according to claim 21, wherein the at least one second electromechanical element configured to measure an axial force that the central portion is subjected to and is parallel to the normal vector of the central portion.

24. The force measurement device according to claim 1, wherein the second sensing portion is in a shape surrounding the central portion.

* * * * *